US010578501B2

(12) United States Patent
Kim et al.

(10) Patent No.: US 10,578,501 B2
(45) Date of Patent: Mar. 3, 2020

(54) FLEXIBLE TACTILE SENSOR AND METHOD FOR MANUFACTURING THE SAME

(71) Applicant: KOREA ELECTRONICS TECHNOLOGY INSTITUTE, Seongnam-si, Gyeonggi-do (KR)

(72) Inventors: Kunnyun Kim, Yongin-si (KR); Kwang Bum Park, Yongin-si (KR); Won Hyo Kim, Yongin-si (KR); Yeon Hwa Kwak, Seoul (KR)

(73) Assignee: Korea Electronics Technology Institute, Seongnam-si, Gyeonggi-do (KR)

( * ) Notice: Subject to any disclaimer, the term of this patent is extended or adjusted under 35 U.S.C. 154(b) by 4 days.

(21) Appl. No.: 15/891,259

(22) Filed: Feb. 7, 2018

(65) Prior Publication Data
US 2018/0172527 A1 Jun. 21, 2018

Related U.S. Application Data

(63) Continuation of application No. PCT/KR2016/001245, filed on Feb. 4, 2016.

(30) Foreign Application Priority Data

Aug. 7, 2015 (KR) .......................... 10-2015-0111692

(51) Int. Cl.
*G01L 5/00* (2006.01)
*G01L 1/22* (2006.01)
(Continued)

(52) U.S. Cl.
CPC ........... *G01L 1/2287* (2013.01); *B25J 13/084* (2013.01); *G01B 7/18* (2013.01); *G01L 1/205* (2013.01);
(Continued)

(58) Field of Classification Search
CPC .......... G01L 1/2287; G01L 1/205; G01L 1/22; G01L 1/2268; G01L 5/161; G01L 5/228; B25J 13/084; G01B 7/18; H01L 21/768
(Continued)

(56) References Cited

U.S. PATENT DOCUMENTS

| 7,094,061 B1 * | 8/2006 | Kieffer .................. G01L 5/0047 |
| | | 439/65 |
| 2002/0121909 A1 * | 9/2002 | Sato ...................... G06K 9/0002 |
| | | 324/686 |

(Continued)

FOREIGN PATENT DOCUMENTS

| JP | 2000-082608 A | 3/2000 |
| KR | 10-0703082 B1 | 4/2007 |

(Continued)

OTHER PUBLICATIONS

International Search Report dated May 12, 2016 of PCT/KR2016/001245 which is the parent application and its English Translation—4 pages.

*Primary Examiner* — Max H Noori
(74) *Attorney, Agent, or Firm* — Knobbe Martens Olson & Bear LLP

(57) ABSTRACT

Provided are a flexible tactile sensor and a method for manufacturing the same. The flexible tactile sensor includes a polymer layer, a first metal layer formed over the polymer layer and a first sensor layer formed over the first metal layer, the first sensor layer comprising a strain gauge configured to change its resistance according to a first strain and a metal wire connected to the strain gauge. The flexible tactile sensor also includes a first cover layer configured to protect the first sensor layer, a second metal layer formed under the polymer layer, a second sensor layer formed under the second metal layer. The second sensor layer includes a strain gauge configured to change its resistance according to
(Continued)

a second strain and a metal wire connected to the strain gauge of the second metal layer and a second cover layer configured to protect the second sensor layer.

7 Claims, 9 Drawing Sheets

(51) Int. Cl.
*G01L 5/161* (2020.01)
*B25J 13/08* (2006.01)
*G01B 7/16* (2006.01)
*G01L 5/22* (2006.01)
*G01L 1/20* (2006.01)

(52) U.S. Cl.
CPC .............. *G01L 1/22* (2013.01); *G01L 1/2268* (2013.01); *G01L 5/161* (2013.01); *G01L 5/228* (2013.01)

(58) Field of Classification Search
USPC ...................................... 73/862.042
See application file for complete search history.

(56) References Cited

U.S. PATENT DOCUMENTS

| 2006/0021453 | A1* | 2/2006 | Kutlu .................. G01L 5/0047 |
| | | | 73/862.474 |
| 2007/0240524 | A1* | 10/2007 | Speckhart ......... G01G 19/4142 |
| | | | 73/862.381 |
| 2011/0053737 | A1 | 3/2011 | Chang et al. |
| 2018/0160940 | A1* | 6/2018 | Kim ........................ G06F 3/016 |
| 2018/0160979 | A1* | 6/2018 | Kim ........................ G01L 1/205 |

FOREIGN PATENT DOCUMENTS

| KR | 10-0997108 B1 | 11/2010 |
| WO | 2012/072240 A1 | 6/2012 |
| WO | 2014/052688 A1 | 4/2014 |

* cited by examiner

FLEXIBLE TACTILE SENSOR AND METHOD FOR MANUFACTURING THE SAME

CROSS-REFERENCE TO RELATED APPLICATIONS

This application is a continuation application, and claims the benefit under 35 U.S.C. §§ 120 and 365 of PCT Application No. PCT/KR2016/001245, filed on Feb. 4, 2016, which is hereby incorporated by reference. PCT/KR2016/001245 also claimed priority from Korean Patent Application No. 10-2015-0111692 filed on Aug. 7, 2015, which is hereby incorporated by reference.

BACKGROUND

Field

The present disclosure relates to a flexible tactile sensor and a method for manufacturing the same, and more particularly, to a flexible tactile sensor that can sense a touch on both sides and a method for manufacturing the same.

Related Art

A tactile sensor is a sensor that measures a local force or pressure affected by a contact parameter, i.e., a contact, between the sensor and an object.

Tactile sensors may not only be used in various medical devices for surgery, cancer diagnosis, and the like, and medical procedures but also be applied to various fields such as a virtual environment implementation field, a tactile display field, and the like. A force/torque sensor of six degrees of freedom used for the wrist of an industrial robot and a tactile sensor capable of sensing a contact force and momentary slip for a gripper of a robot have already been developed. For example, these developed tactile sensors include a 3-axis force component-based tactile sensor that can sense information regarding a contact force in X, Y, and Z axis directions, and the like.

Korean Patent Registration No. 10-0703082 discloses a flexible tactile sensor and a method for manufacturing the same. This patent provides a tactile sensor including a membrane layer having a sensing region and formed of a photosensitive polymer, a membrane support layer formed on a lower surface of the membrane layer to have a window defining the sensing region and including at least two photosensitive polymer layers, a plurality of metal strain gauges formed on the lower surface of the membrane layer such that at least a portion thereof is positioned in the sensing region, and arranged to face each other, a first metal wire formed on a lower surface of the membrane layer so as to be connected to each of the plurality of metal strain gauges, and a second metal wire formed between the at least two photosensitive polymer layers so as to be connected to each of the plurality of metal strain gauges.

Korean Patent Registration No. 10-0997108 discloses a tactile sensor and a method for manufacturing the same. This patent provides a miniaturized tactile sensor that can sense an action even when a magnitude of the action on the tactile sensor from the outside is small, and a method for manufacturing the same including a simplified manufacturing process, contributing to a reduction manufacturing cost and manufacturing time and enhancement of productivity.

The present disclosure is made in association with a Korean national research and development project (research project name: Development of precise motion tracking and pressure sensing technology with flexible/ultra thin/light weight strain and force sensors for finger motion tracking, project identification number: 10079763).

The disclosure of this section is to provide background of the described technology. Applicant notes that this section may contain information available before this application. However, by providing this section, Applicant does not admit that any information contained in this section constitutes prior art.

SUMMARY

An aspect of the present invention provides a flexible tactile sensor that can sense a force on both sides thereof and a method for manufacturing the same.

An aspect of the present invention also provides a flexible tactile sensor which is reduced in thickness to obtain high flexibility and enables sensing on both sides to increase accuracy of sensing, and a method for manufacturing the same.

An aspect of the present invention also provides a flexible tactile sensor having a simplified sensor structure to enhance productivity, and a method for manufacturing the same.

In an aspect, a flexible tactile sensor includes: a polymer layer; a first metal layer formed on an upper surface of the polymer layer; a first sensor layer formed on an upper surface of the first metal layer and including a strain gauge changed in a resistance value according to strain and a metal wire connected to the strain gauge; a first cover layer protecting the first sensor layer; a second metal layer formed on a lower surface of the polymer layer; a second sensor layer formed on a lower surface of the second metal layer and including a strain gauge changed in a resistance value according to strain and a metal wire connected to the strain gauge; and a second cover layer protecting the second sensor layer.

In an embodiment, the polymer layer is a polyimide layer.

In an embodiment, the first metal layer and the second metal layer are nickel-chromium (Ni—Cr) layers.

The first sensor layer may include a first strain gauge and a first metal wire connected to one end and the other end of the first strain gauge and a second strain gauge and a second metal wire connected to one end and the other end of the second strain gauge.

In an embodiment, the first strain gauge and the second strain gauge may be formed such that longitudinal axes thereof are at a predetermined angle with respect to a vertical axis of a plane.

In an embodiment, the first strain gauge and the second strain gauge are spaced apart from each other and formed such that longitudinal axes thereof have a '∧' shape.

The first strain gauge and the second strain gauge may have a continuous '⇄' shape.

The first strain gauge and the second strain gauge may have an 'X' shape.

In an embodiment, the first strain gauge and the second strain gauge are formed such that lengths of line widths and lengths of gaps between lines thereof are different.

In certain embodiments, a length of a line width of the first strain gauge is in a range of 40 μm to 90 μm, a length of a gap between lines is in a range of 110 μm to 160 μm, a length of a line width of the second strain gauge is in a range of 50 μm to 100 μm and a length of a gap between lines is in a range of 100 μm to 150 μm.

In an embodiment, the first strain gauge outputs a first sensing value, and the second strain gauge outputs a second sensing value for correcting or compensating the first sensing value.

The second sensor layer may include a third strain gauge and a third metal wire connected to one end and the other end of the third strain gauge and a fourth strain gauge and a fourth metal wire connected to one end and the other end of the fourth strain gauge.

The first sensor layer may include a first strain gauge and a first metal wire connected to one end and the other end of the first strain gauge and the second sensor layer may include a second strain gauge and a second metal wire connected to one end and the other end of the second strain gauge.

In an embodiment, the first strain gauge and the second strain gauge are formed such that longitudinal axes thereof are perpendicular to each other.

In some embodiments, a method for manufacturing a flexible tactile sensor includes: forming a first metal layer and a second metal layer on upper and lower surfaces of a polymer layer, respectively; patterning a strain gauge on each of an upper surface of the first metal layer and a lower surface of the second metal layer; patterning a metal wire connected to each of the strain gauges; and forming a first cover layer protecting the strain gauge and the metal wire formed on the upper surface of the first metal layer and a second cover layer protecting the strain gauge and the metal wire formed on the lower surface of the second metal layer.

The patterning of a strain gauge may include: patterning a first strain gauge and a second strain gauge on the upper surface of the first metal layer and the lower surface of the second metal layer, respectively.

In an embodiment, the first strain gauge and the second strain gauge are patterned such that longitudinal axes thereof are at a predetermined angle with respect to a vertical axis of a plane.

In an embodiment, the first strain gauge and the second strain gauge are spaced apart from each other and formed such that longitudinal axes thereof have a '∧' shape.

In an embodiment, the first strain gauge and the second strain gauge are patterned in a continuous '彐' shape.

In an embodiment, the first strain gauge and the second strain gauge are patterned such that lengths of line widths and gaps between lines thereof are different.

The patterning of a strain gauge may include patterning a first strain gauge on an upper surface of the first metal layer and patterning a second strain gauge on a lower surface of the second metal layer.

In an embodiment, in the patterning of a strain gauge, the first strain gauge and the second strain gauge are patterned such that longitudinal axis thereof are perpendicular to each other.

In some embodiments, a method for manufacturing a flexible tactile sensor includes: forming a first metal layer on an upper surface of a polymer layer; patterning a strain gauge on an upper surface of the first metal layer; patterning a metal wire connected to the strain gauge; forming a first cover layer protecting the strain gauge and the metal wire formed on the upper surface of the first metal layer; forming a second metal layer on a lower surface of the polymer layer; patterning a strain gauge on a lower surface of the second metal layer; patterning a metal wire connected to the strain gauge; and forming a second cover layer protecting the strain gauge and the metal wire formed on the lower surface of the second metal layer.

The flexible tactile sensor may provide an accurate sensing result by sensing a force from both sides thereof.

According to at least one of the disclosed embodiments, a thickness of the sensor is reduced to increase flexibility, and since it is possible to sense from both sides, accuracy of sensing is increased.

Furthermore, the flexible tactile sensor and the method for manufacturing the same may enhance productivity of the sensor through a simplified sensor structure.

DESCRIPTION OF EMBODIMENTS

Figure 1:
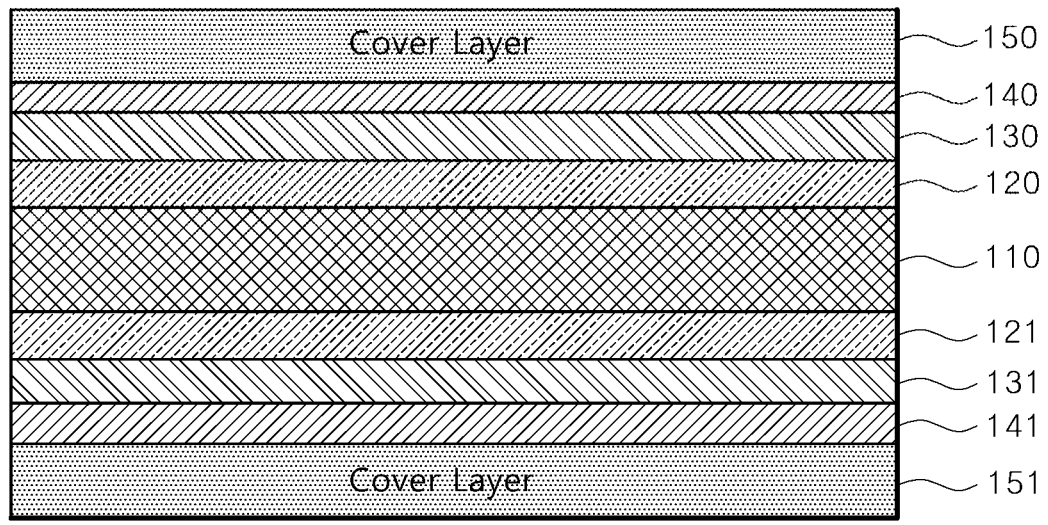
FIG. 1 is a schematic cross-sectional view of a flexible tactile sensor according to an embodiment of the present invention.

The scope of the present invention is not limited to the disclosed embodiments. That is, since embodiments of the invention may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. For example, a first component may be named a second component and, similarly, the second component may also be named the first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~between", "immediately~between" or "adjacent to~" and "directly adjacent to~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not describe order of respective steps. The respective steps may be changed from a mentioned order unless specifically mentioned in context. Namely, respective steps may be performed in the same order as described, may be substantially simultaneously performed, or may be performed in reverse order.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a schematic cross-sectional view of a flexible tactile sensor according to an embodiment of the present invention.

Referring to FIG. 1, a flexible tactile sensor includes a polymer layer 110, a first metal layer 120 formed on the polymer layer 110, a first sensor layer 130 formed on the first metal layer 120 and including a strain gauge changed in a resistance value according to strain (or deformation) and a metal wire connected to the strain gauge. The flexible tactile sensor also includes a first cover layer 150 protecting the first sensor layer 130, a second metal layer 121 formed on a lower surface of the polymer layer 110, a second sensor layer 131 formed on a lower surface of the second metal layer 121 and including a strain gauge changed in a resistance value according to strain and a metal wire connected to the strain gauge, and a second cover layer 151 protecting the second sensor layer 131.

The polymer layer 110 may be flexibly bent by an external force, while maintaining a structure of the sensor. In an embodiment, the polymer layer 110 is a polyimide (PI) layer. Polyimide has high thermal stability and stable physical and chemical properties and is thin and flexible. In an embodiment, the polymer layer 110 may have a thickness of 25 μm.

The first metal layer 120 and the second metal layer 121 are formed on an upper surface (in an outward direction) and a lower surface (or in an outward direction) of the polymer layer 110, respectively. The first metal layer 120 and the second metal layer 121 may be formed by depositing nickel-chromium (Ni—Cr) on the upper and lower surfaces of the polymer layer 110, respectively. In an embodiment, the first metal layer 120 and the second metal layer 121 may each have a thickness of 400 ø. In an embodiment, the first metal layer 120 and the second metal layer 121 are deposited only at positions where a strain gauge is to be patterned.

The first sensor layer 130 includes a strain gauge formed on an upper surface of the first metal layer 120 and having a resistance value changed according to strain and a metal wire connected to the strain gauge. After the strain gauge is patterned on top of the first metal layer 120, a metal wire may be connected to the strain gauge. After the metal wire is connected to one end and the other end of the strain gauge, the strain gate may be connected to a first electrode and a second electrode. The metal wire may be patterned with copper (Cu) and connected to the strain gauge. In an embodiment, the first sensor layer 130 may have a thickness of 13 μm.

The second sensor layer 131 includes a strain gauge formed on a lower surface of the second metal layer 121 and having a resistance value changed according to strain and a metal wire connected to the strain gauge. A description of the second sensor layer 131 is the same as that of the first sensor layer 130.

The first cover layer 150 may be provided on the first sensor layer 130 to protect the first sensor layer 130 and the second cover layer 151 may be provided under the second sensor layer 131 to protect the second sensor layer 131. In an embodiment, the cover layers 150 and 151 are polyester (PET) layers.

A first adhesive layer 140 may be formed on the first sensor layer 130 and the first cover layer 150 may be adhered to the first sensor layer 130 via the first adhesive layer 140. Similarly, a second adhesive layer 141 may be formed under the second sensor layer 131 and the second cover layer 151 may be adhered to the second sensor layer 131 via the second adhesive layer 141. For example, after applying an adhesive or applying an adhesive film to the sensor layers 130 and 131, the cover layers 150 and 151 may be adhered to the sensor layers 130 and 131.

The flexible tactile sensor of FIG. 1 has sensors on both sides thereof to sense a force on both sides. For example, when the flexible tactile sensor is bent to one side by an external force, the flexible tactile sensor may sense the bending from both sides (bending up and bending down), and thus, accuracy of sensing may be improved. Further, the flexible tactile sensor may measure a normal force applied to a point thereof.

Figure 2:
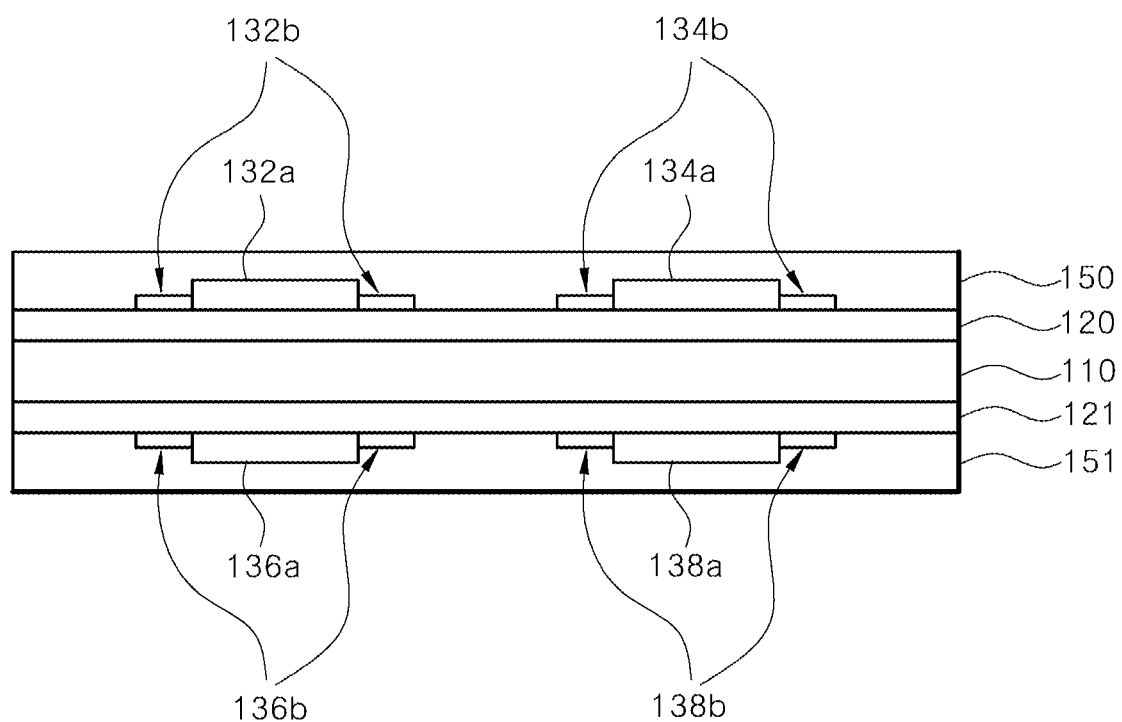
FIG. 2 is a specific cross-sectional view of the flexible tactile sensor of FIG. 1.

FIG. 2 is a specific cross-sectional view of the flexible tactile sensor of FIG. 1.

Referring to FIG. 2, the first sensor layer 130 includes a first strain gauge 132a and a first metal wire 132b connected to one end and the other end of the first strain gauge 132a and a second strain gauge 134a and a second metal wire 134b connected to one end and the other end of the second strain gauge 134a. The first strain gauge 132a and the second strain gauge 134a may be spaced apart from each other.

In an embodiment, the first strain gauge 132a and the first metal wire 132b correspond to a sensor module for driving (or a driving sensor module), and the second strain gauge 134a and the second metal wire 134b correspond to a sensor module for correction (or a correction sensor module). For example, the first strain gauge 132a outputs a first sensing value via the first metal wire 132b, and the second strain gauge 134a outputs a second sensing value for correcting the first sensing value via the second metal wire 134b.

For example, the metal strain gauges has resistance characteristics that resistance linearly increases as a temperature rises. Therefore, a monitoring server may include a module or an algorithm for correcting a sensing value and correct an error of a sensing value based on a temperature difference between the sensor modules using the first sensing value output from the driving sensor module and the second sensing value output from the correction sensor module.

The second sensor layer 131 includes a third strain gauge 136a and a third metal wire 136b connected to one end and the other end of the third strain gauge 136a and a fourth strain gauge 138a and a fourth metal wire 138b connected to one end and the other end of the fourth strain gauge 138a. The third strain gauge 136a and the fourth strain gauge 138a may be spaced apart from each other.

In an embodiment, the third strain gauge 136a and the third metal wire 136b correspond to a driving sensor module, and the fourth strain gauge 138a and the fourth metal wire 138b correspond to a correction sensor module. For example, the third strain gauge 136a may output a third sensing value via the third metal wire 136b, and the fourth strain gauge 138a may output a fourth sensing value for correcting the third sensing value via the fourth metal wire 138b.

In an embodiment, the first metal layer and the second metal layer are deposited on the entirety of the polymer layer 110 or are deposited only at positions 120a, 120b, 121a, and 121b where the strain gauges are patterned.

Figure 3:
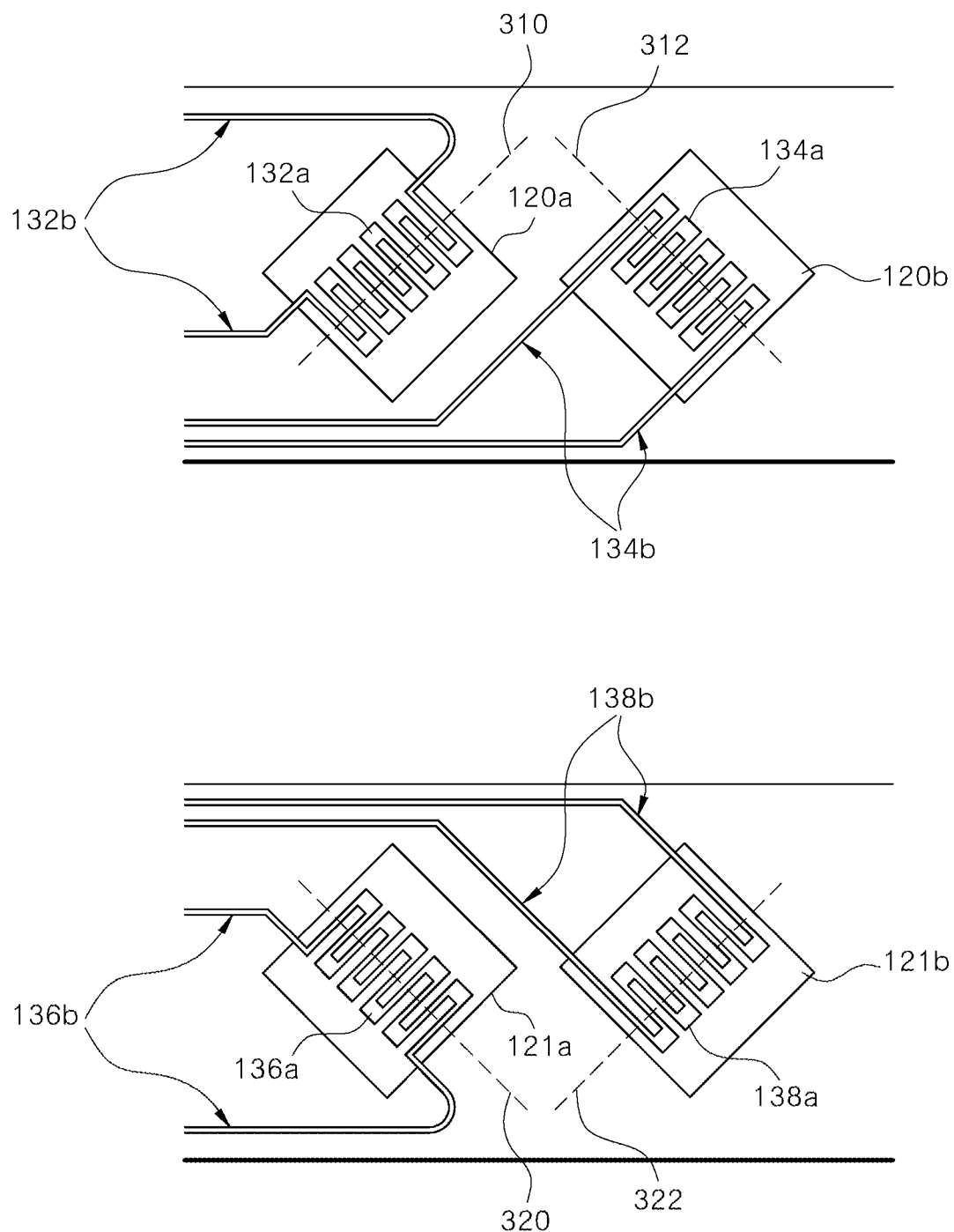
FIG. 3 is a view illustrating strain gauges and metal wires of the flexible tactile sensor of FIG. 2.

FIG. 3 is a view illustrating strain gauges and metal wires of the flexible tactile sensor of FIG. 2.

Referring to FIG. 3, the strain gauges 132a, 134a, 136a, and 138a are patterned in a continuous '弓' shape. A metal wire is connected to each of the ends of the strain gauges.

In an embodiment, lengths of line widths and lengths of gaps between lines of the strain gauges 132a and 136a of the driving sensor module and lengths of line widths and gaps between lines of the strain gauges 134a and 138a of the correction sensor module are different. The lengths of the line widths and the lengths of the gaps between the lines may be different depending on an application target of the sensor, a main measurement direction of a force, and the like.

For example, a width of lines (line patterns) of the strain gauges 132a and 136a of the driving sensor module may be in a range of 40 μm to 90 μm, a gap between two immediately neighboring lines (line patterns) may be in a range of 110 μm to 160 μm, and a width of lines of the strain gauges 134a and 138a may be in a range of 50 μm to 100 μm and a gap between the two immediately neighboring lines may be in a range of 100 μm to 150 μm.

In an embodiment, a width of lines (line patterns) of the strain gauges 132a and 136a of the driving sensor module is 65 μm and a gap between two immediately neighboring lines is 135 μm, and a width of lines of strain gauges 134a and 138a is 75 μm and a gap between the two immediately neighboring lines is 125 μm.

In an embodiment, the strain gauges 132a, 134a, 136a, and 138a may be formed such that at least a portion (e.g., top and bottom portions) of an expected folding line or bending line of the flexible tactile sensor is parallel to longitudinal axes 310, 312, 320, and 322 of the strain gauges 132a, 134a, 136a, and 138a. As the folding line or bending line of the flexible tactile sensor becomes parallel to the longitudinal axis 310, 312, 320, and 322 of the strain gauges 132a, 134a, 136a, and 138a, strain of the strain gauges is increased to increase measurement accuracy. In an embodiment, the expected folding line or bending line of the flexible tactile sensor is assumed by a designer in advance in consideration of an application target, an application position, a measurement target force, and the like, and the strain gauges 132a, 134a, 136a, is formed based on the corresponding assumption.

For example, in FIG. 3, the first strain gauge 132a of the driving sensor module and the second strain gauge 134a of the correction sensor module are arranged to have different orientations such that the longitudinal axes 310 and 312 thereof are at a predetermined angle with respect to a vertical axis of the plane (e.g., when viewed over the top, in a direction perpendicular to a major surface of the polymer layer). For example, the first strain gauge 132a and the second strain gauge 134a may be oblique to each other.

In an embodiment, the first strain gauge 132a and the second strain gauge 134a are spaced from each other and the longitudinal axes 310 and 312 thereof intersect at the top to form a '∧' shape.

The third strain gauge 136a of the driving sensor module and the fourth strain gauge 138a of the correction sensor module may be formed such that the longitudinal axes 320 and 322 are at a predetermined angle with respect to a vertical axis of the plane. For example, the third strain gauge 136a and the fourth strain gauge 138a may be oblique to each other.

In an embodiment, the third strain gauge 136a and the fourth strain gauge 138a are spaced from each other and the longitudinal axes 320 and 322 intersect at the bottom to form a '∨' shape.

In an embodiment, the first strain gauge 132a and the third strain gauge 136a are formed at opposite positions corresponding to each other and the second strain gauge 134a and the fourth strain gauge 138a may be formed at opposite positions corresponding to each other. In another embodiment, the first strain gauge 132a and the second strain gauge 134a on one side and the third strain gauge 136a and the fourth strain gauge 138a on the other side are formed to intersect with each other when viewed in a direction perpendicular to a major surface of the polymer layer 110. For example, the first strain gauge 132a, the third strain gauge 136a, the second strain gauge 134a, and the fourth strain gauge 138a may be formed to intersect with each other in this order.

The flexible tactile sensor configured as described above is equipped with the sensors on both sides to accurately sense a force on both sides.

Figure 4:
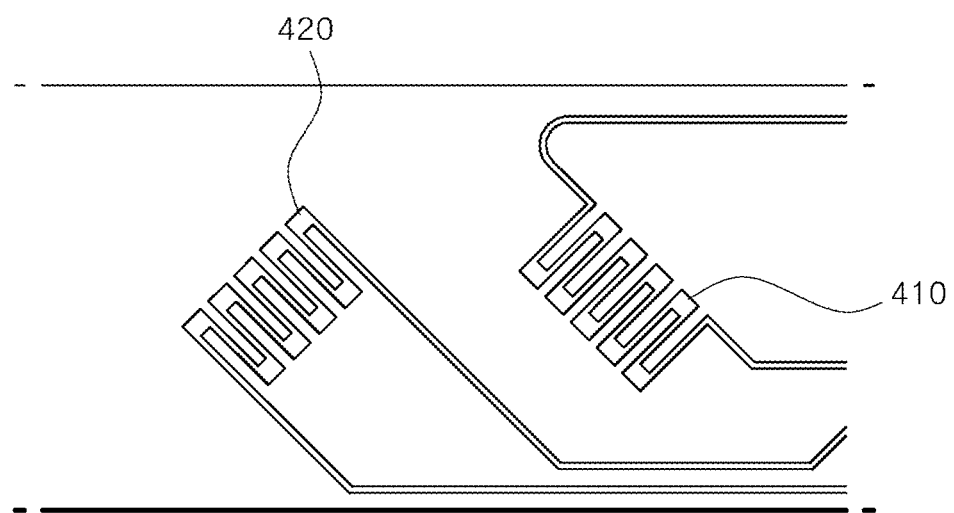
FIG. 4 is a view illustrating an embodiment of the flexible tactile sensor of FIG. 2.

FIG. 4 is a view illustrating an embodiment of a flexible tactile sensor of FIG. 2.

Referring to FIG. 4, it can be seen that a driving sensor module 410 and a correction sensor module 420 are provided on one side of the flexible tactile sensor. The strain gauges of the tactile sensor module may be formed on the same side as illustrated in FIG. 4 or on different sides.

Figure 5A:
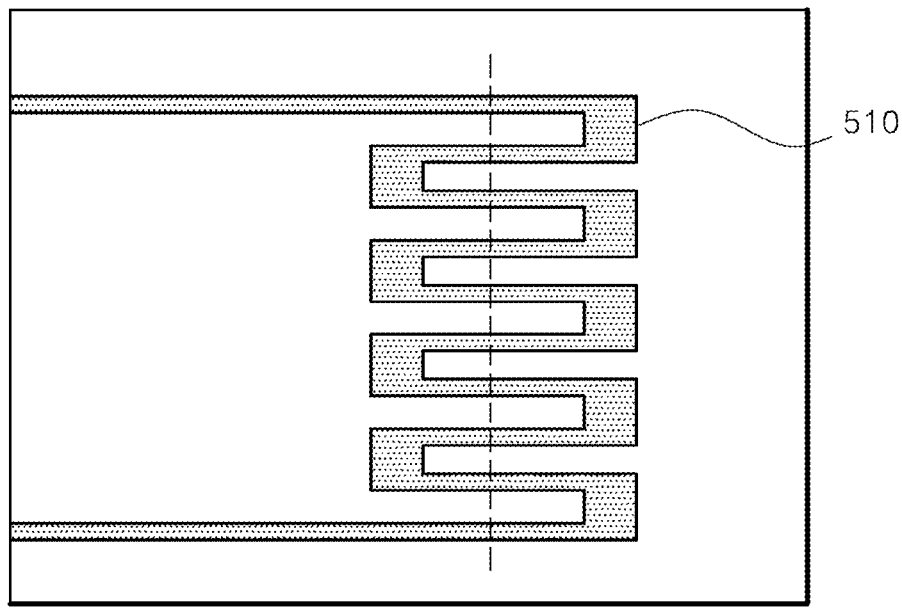
FIGS. 5A and 5B illustrate another embodiment of a tactile sensor module.
Figure 5B:
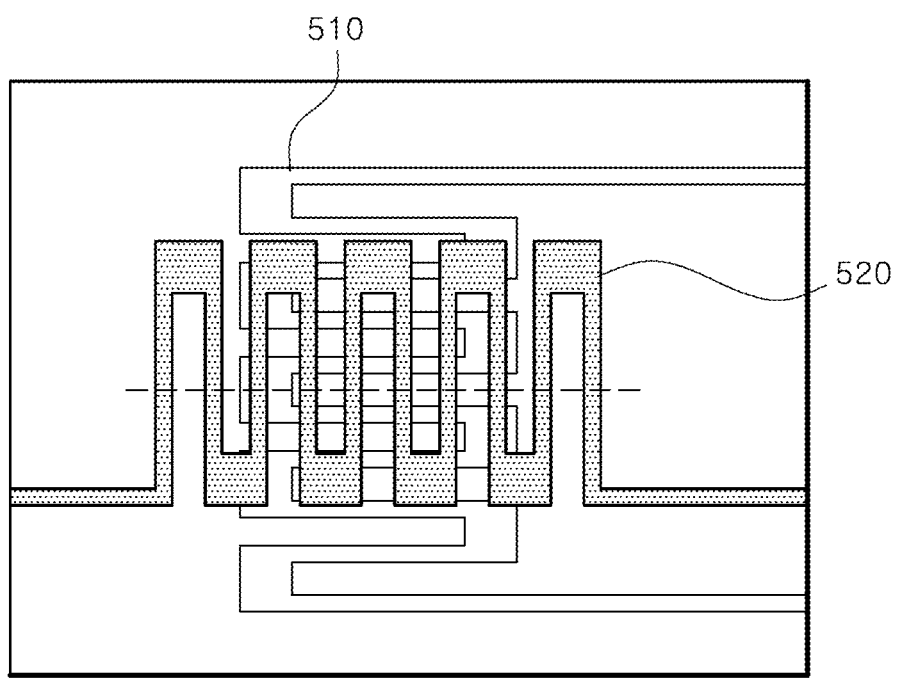

FIGS. 5A and 5B illustrate another embodiment of a tactile sensor module.

Referring to FIGS. 5A and 4B, a first strain gauge 510 is formed on a first side (FIG. 5A) and a second strain gauge 520 is formed on a second side (opposite side of the first side) (FIG. 5B). In an embodiment, the first strain gauge 510 and the second strain gauge 520 may be formed such that the longitudinal axes thereof are perpendicular to each other. In another embodiment, the first strain gauge 510 and the second strain gauge 520 may be formed such that longitudinal axes thereof intersect with each other slantingly.

For example, in FIGS. 5A and 5B, the first strain gauge 510 are formed such that the longitudinal axis thereof is perpendicular to a horizontal plane of the first side (FIG. 5A) and the second strain gauge 520 may be formed so that the longitudinal axis thereof are parallel to the horizontal plane of the second side (FIG. 5B), so as to be perpendicular to each other. Through the tactile sensor module formed as described above, a user may check a strain direction based on an applied force.

In an embodiment, the first strain gauge 510 corresponds to a strain gauge of a first driving sensor module and the second strain gauge 520 corresponds to a strain gauge of a second driving sensor module. In this case, the monitoring server (or a manager) may include a module or algorithm for correcting a sensing value in a predetermined manner and correct the sensing value output from each driving sensor module.

In another embodiment, the first strain gauge 510 corresponds to the strain gauge of the driving sensor module, and the second strain gauge 520 may correspond to the strain gauge of the correction sensor module.

Figure 6:
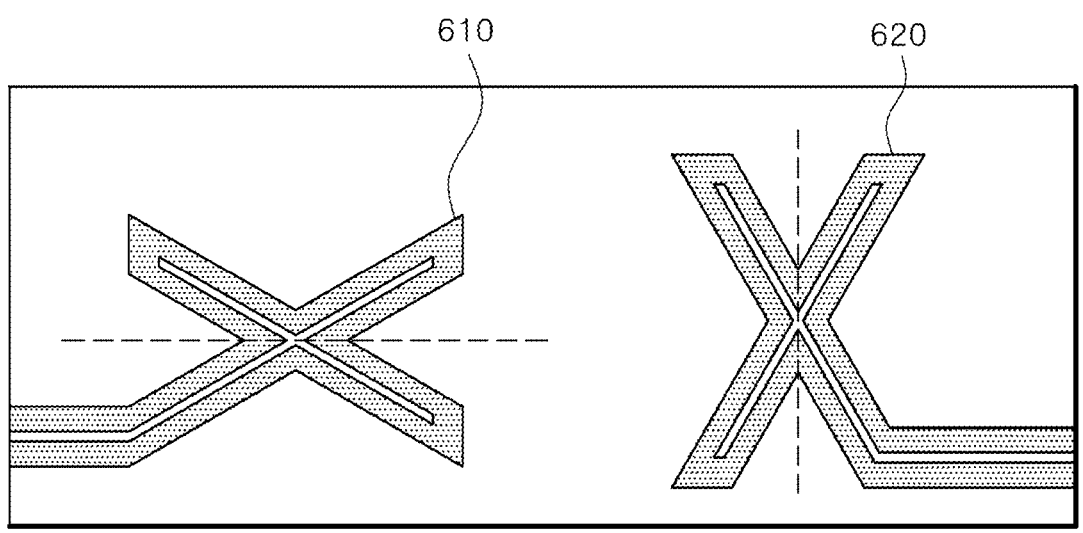
FIG. 6 is a view illustrating another embodiment of a tactile sensor module.

FIG. 6 is a view illustrating another embodiment of a tactile sensor module.

Referring to FIG. 6, a first strain gauge 610 and a second strain gauge 620 are formed on the same plane. In another embodiment, the first strain gauge 610 and the second strain gauge 620 may be formed on different sides.

The strain gauges 610 and 620 may be patterned in an 'X' shape, and metal wires may be connected to ends of the strain gauges 610 and 620, respectively.

In an embodiment, a longitudinal axis of the first strain gauge 610 and a longitudinal axis of the second strain gauge 620 may be in different directions. For example, in FIG. 6, the first strain gauge 610 is formed such that the longitudinal axis is parallel to a horizontal plane of the corresponding surface, and the second strain gauge 620 may be formed such that the longitudinal axis is perpendicular to the horizontal plane of the corresponding surface. In another embodiment, the longitudinal axis of first strain gauge 610 and the longitudinal axis of the second strain gauge 620 may be in the same direction.

In an embodiment, the first strain gauge 610 may correspond to a strain gauge of a first driving sensor module and the second strain gauge 620 may correspond to a strain gauge of a second driving sensor module. In this case, the monitoring server (or the manager) may include a module or algorithm for correcting a sensing value in a predetermined manner and may correct a sensing value output from each driving sensor module.

In another embodiment, the first strain gauge 610 corresponds to a strain gauge of a driving sensor module and the second strain gauge 620 may correspond to a strain gauge of a correction sensor module.

In the embodiments of FIGS. 4 to 6, each flexible tactile sensor includes a strain gauge of the same pattern, but a single flexible tactile sensor may include strain gauges of different patterns. For example, the single flexible tactile sensor may include both a strain gauge in a 'ㄹ' shape and a strain gauge in an 'X' shape.

Figure 7A:
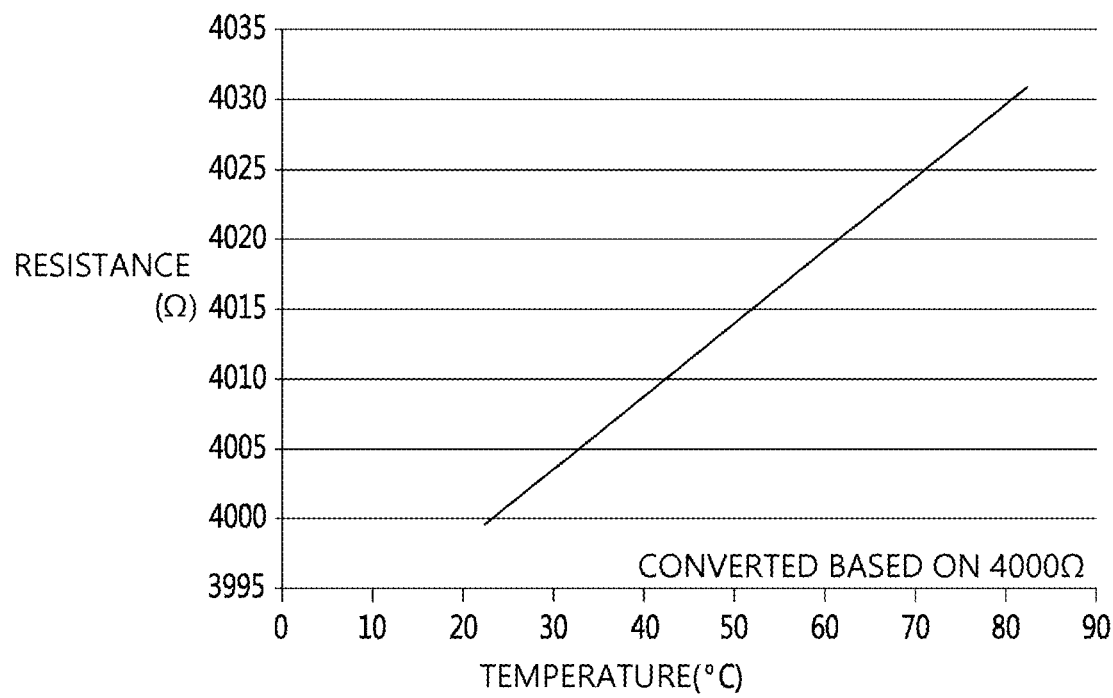
FIGS. 7A and 7B illustrate characteristics of the flexible tactile sensor of FIG. 4.
Figure 7B:
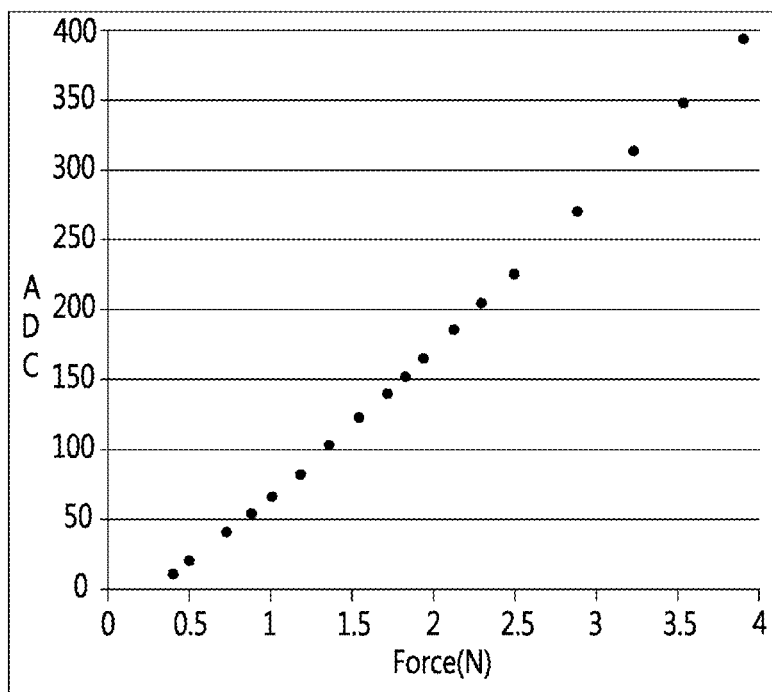

FIGS. 7A and 7B illustrate characteristics of the flexible tactile sensor of FIG. 4.

FIG. 7A is a graph illustrating a variation in resistance of a flexible tactile sensor over temperature. Referring to FIG. 7A, it can be seen that the resistance of the manufactured flexible tactile sensor increases linearly as temperature increases.

FIG. 7B is a graph illustrating an output value of the flexible tactile sensor over externally applied force. Referring to FIG. 7B, it can be seen that the output value of the manufactured flexible tactile sensor linearly increases as the external applied force increases.

Figure 8:
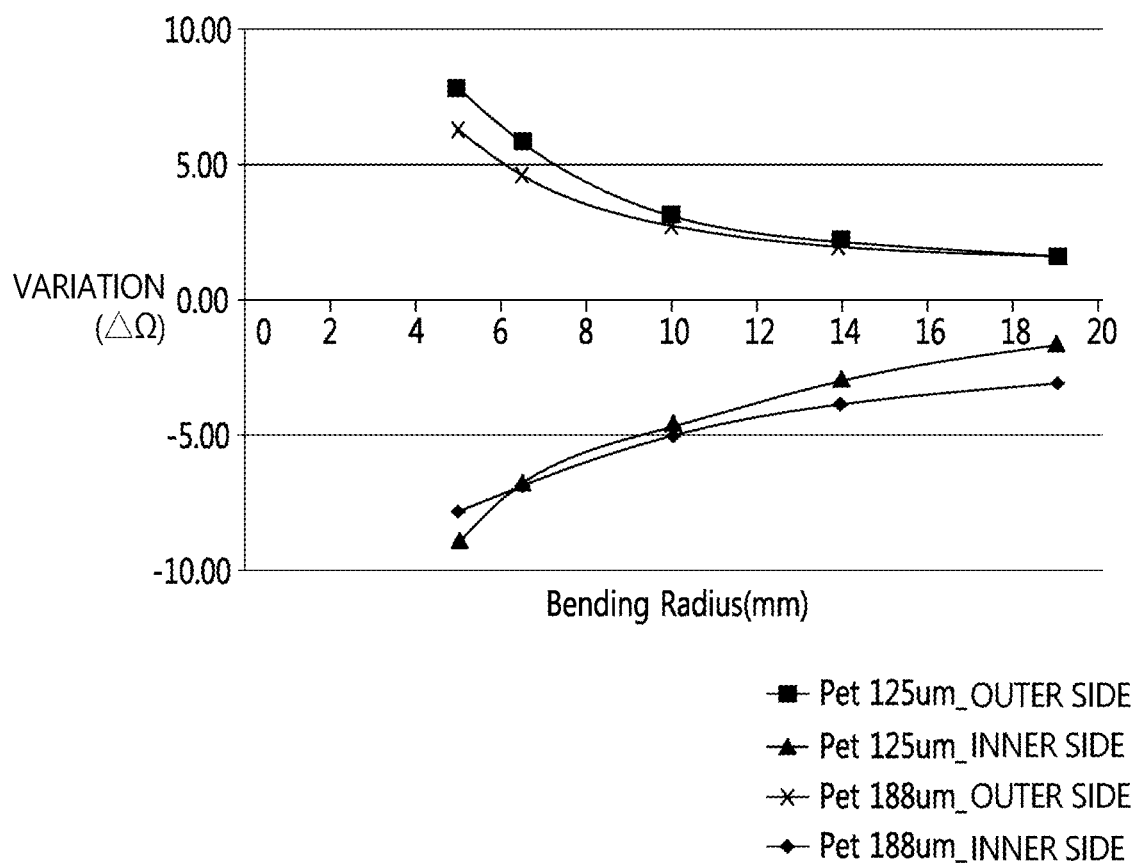
FIG. 8 is a graph illustrating a variation in resistance according to a bending radius of the flexible tactile sensor illustrated in FIG. 4.

FIG. 8 is a graph illustrating a variation in resistance over bending radius of the flexible tactile sensor of FIG. 4.

Referring to FIG. 8, when the bending radius of the flexible tactile sensor is within 5 mm, there is no variation in resistance, and when the bending radius is 5 mm or greater, the resistance of the flexible tactile sensor is varied and the variation is gradually reduced as the bending radius increases.

Further, when a force is applied to one side of the flexible tactile sensor, it can be seen that a negative variation value is measured in the sensor module adjacent to the side (inner side) to which the force is applied (inner side) and a positive variation value is measured in the sensor module adjacent to the opposite side (outer side).

When the bending radius is within 5 mm, the flexible tactile sensor may be used stably.

FIGS. 9A to 9D are views illustrating a method of manufacturing a flexible tactile sensor according to an embodiment of the present invention.

FIGS. 9A to 9D illustrate a method of simultaneously manufacturing both sides of a flexible tactile sensor.

Figure 9A:
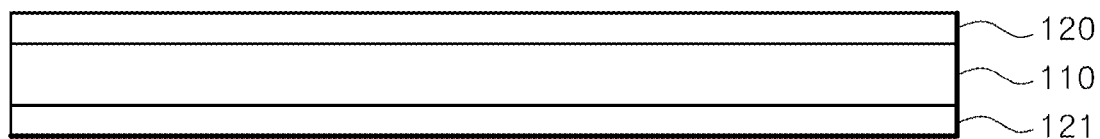
FIGS. 9A to 9D are views illustrating a method of manufacturing a flexible tactile sensor according to an embodiment of the present invention.

First, a first metal layer 120 and a second metal layer 121 are formed on upper and lower surfaces of a polymer layer 110, respectively (FIG. 9A). The first metal layer 120 and the second metal layer 121 may be formed by depositing nickel-chromium (Ni—Cr) on the upper and lower surfaces of the polymer layer 110.

Figure 9B:
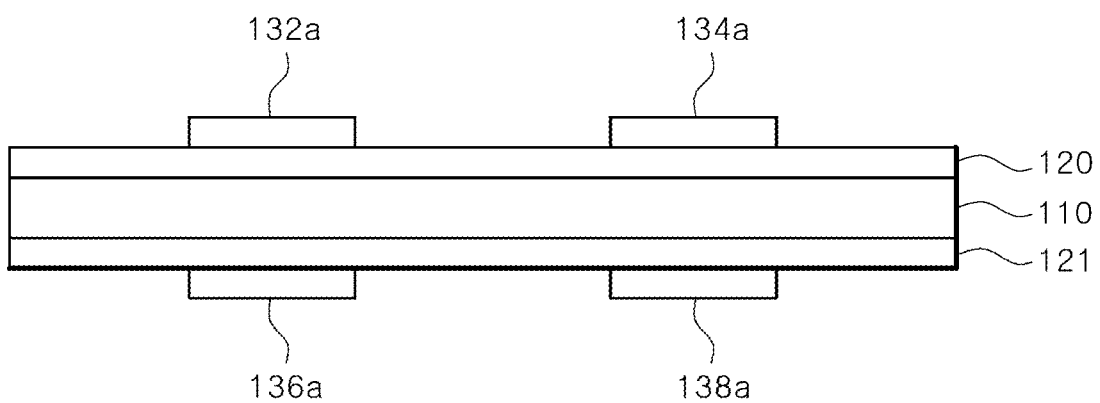
Figure 9C:
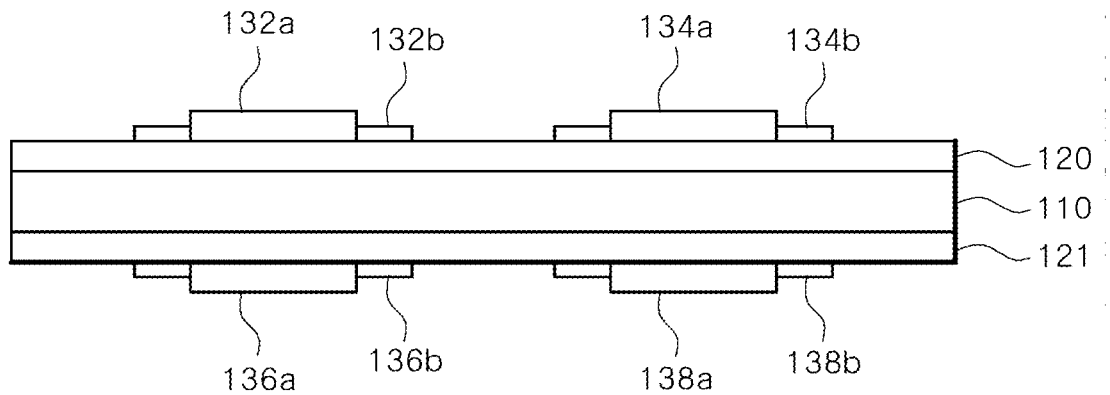

Next, strain gauges 132a, 134a, 136a and 138a are patterned on an upper surface of the first metal layer 120 and a lower surface of the second metal layer 121, respectively (FIG. 9B). In an embodiment, each of the strain gauges 132a, 134a, 136a, and 138a may be patterned in a continuous 'ㄹ' shape. In another embodiment, each of the strain gauges 132a, 134a, 136a, 138a may be patterned in an 'X' shape.

In an embodiment, lengths of line widths and lengths of gaps between lines of the strain gauges 132a and 136a of the driving sensor module and the strain gauges 134a and 138a of the correction sensor module may be different.

The strain gauges 132a and 136a of a driving sensor module and the strain gauges 134a and 138a of a correction sensor module may be formed such that the longitudinal axes thereof are at a predetermined angle with respect to the vertical axis of the plane.

In the case of the flexible tactile sensor of FIGS. 5A and 5B, the first strain gauge may be patterned on an upper surface of the first metal layer and the second strain gauge may be patterned on a lower surface of the second metal layer. In an embodiment, the first strain gauge and the second strain gauge may be patterned such that longitudinal axes thereof are perpendicular to each other.

Referring back to FIGS. 9A-9D, after the strain gauges are patterned, metal wires are patterned on the strain gauges 132a, 134a, 136a, and 138a (FIG. 9C).

Figure 9D:
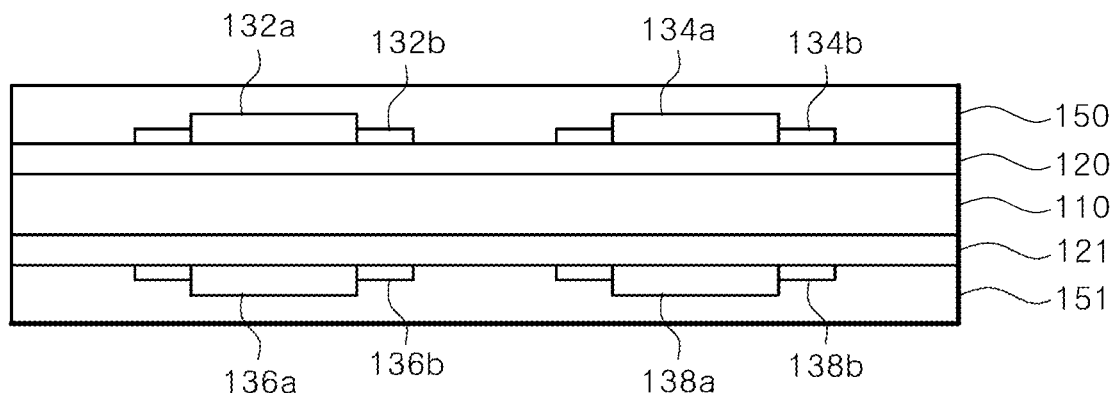

After the metal wires are patterned and connected to the strain gauges, a first cover layer 150 protecting the strain gauge and the metal wire formed on the upper surface of the first metal layer 120 and a second cover layer 150 protecting the strain gauge and the metal wire formed on the lower surface of the second metal layer 121 are formed (FIG. 9D).

For example, the cover layers 150 and 151 may be adhered after applying an adhesive to the strain gauges and the metal wires formed on the metal layers 120 and 121 or attaching an adhesive film thereto.

FIGS. 9A to 9D illustrate the method of simultaneously manufacturing both sides of a flexible tactile sensor, but one side thereof may be manufactured first and the other side may then be manufactured. In this case, a specific manufacturing process of each layer excluding manufacturing order is the same as that described with reference to FIGS. 9A to 9D.

Certain embodiments of the present invention have been described but those skilled in the art will appreciate that various modifications and variations can be made without departing from the scope of the invention.

The present disclosure relates to a flexible tactile sensor and a method of manufacturing the same, and more particularly, to a flexible tactile sensor that can sense a touch on both sides thereof and a method of manufacturing the same.

What is claimed is:

1. A flexible tactile sensor comprising:
    a polymer layer;
    a first metal layer formed over the polymer layer,
    a first sensor layer formed over the first metal layer, the first sensor layer comprising a strain gauge configured to change its resistance according to a first strain and a metal wire connected to the strain gauge;
    a first cover layer configured to protect the first sensor layer;
    a second metal layer formed under the polymer layer;
    a second sensor layer formed under the second metal layer, the second sensor layer including a strain gauge configured to change its resistance according to a second strain and a metal wire connected to the strain gauge of the second metal layer; and
    a second cover layer configured to protect the second sensor layer,
    wherein the strain gauge of the first sensor layer includes a first pair of strain gauges including first and second strain gauges, wherein the metal wire of the first sensor layer includes a first pair of metal wires respectively connected to opposing ends of the first pair of strain gauges,
    wherein the strain gauge of the second sensor layer includes a second pair of strain gauges including third and fourth strain gauges, wherein the metal wire of the second sensor layer includes a second pair of metal wires respectively connected to opposing ends of the second pair of strain gauges,
    wherein a longitudinal axis of the first strain gauge and a longitudinal axis of the second strain gauge intersect with each other,
    wherein a longitudinal axis of the third strain gauge and a longitudinal axis of the fourth strain gauge intersect with each other, and
    wherein lengths of line widths and lengths of gaps between lines of the first and third strain gauges are different from lengths of line widths and gaps between lines of the second and fourth strain gauges.

2. The flexible tactile sensor of claim 1, wherein the longitudinal axis of each of the first to fourth strain gauges forms a predetermined angle with respect to a major surface of the polymer layer.

3. The flexible tactile sensor of claim 2, wherein each of the first and second pairs of strain gauges are spaced apart from each other and formed such that longitudinal axes thereof have a '≈' shape.

4. The flexible tactile sensor of claim 1, wherein each of the first and second pairs of strain gauges have an 'X' shape.

5. The flexible tactile sensor of claim 1, wherein the longitudinal axes of the first and third strain gauges are perpendicular to each other and the longitudinal axes of the second and fourth strain gauges are perpendicular to each other, when viewed in a direction perpendicular to a major surface of the polymer layer.

6. A method for manufacturing a flexible tactile sensor, the method comprising:
    forming a first metal layer and a second metal layer on upper and lower surfaces of a polymer layer, respectively;
    patterning a first pair of strain gauges including first and second strain gauges on an upper surface of the first metal layer and patterning a second pair of strain gauges including third and fourth strain gauges on a lower surface of the second metal layer;
    patterning metal wires connected to the first pair of strain gauges and patterning metal wires connected to the second pair of strain gauges; and
    forming a first cover layer protecting the first pair of strain gauges and the metal wires and forming a second cover layer protecting the second pair of strain gauges and the metal wires,
    wherein the metal wires connected to the first pair of strain gauges include a first pair of metal wires respectively connected to opposing ends of the first pair of strain gauges,
    wherein the metal wires connected to the second pair of strain gauges include a second pair of metal wires respectively connected to opposing ends of the second pair of strain gauges,
    wherein a longitudinal axis of the first strain gauge and a longitudinal axis of the second strain gauge intersect with each other,
    wherein a longitudinal axis of the third strain gauge and a longitudinal axis of the fourth strain gauge intersect with each other, and
    wherein lengths of line widths and lengths of gaps between lines of the first and third strain gauges are different from lengths of line widths and gaps between lines of the second and fourth strain gauges.

7. A method for manufacturing a flexible tactile sensor, the method comprising:
    forming a first metal layer over a polymer layer;
    patterning a first pair of strain gauges including first and second strain gauges over the first metal layer;
    patterning metal wires connected to the first pair of strain gauges;
    forming a first cover layer protecting the first pair of strain gauges and the metal wires;
    forming a second metal layer under the polymer layer;
    patterning a second pair of strain gauges including third and fourth strain gauges under the second metal layer;
    patterning metal wires connected to the second pair of strain gauges; and
    forming a second cover layer protecting the gauge pair of strain gauges and the metal wires,
    wherein the metal wires connected to the first pair of strain gauges include a first pair of metal wires respectively connected to opposing ends of the first pair of strain gauges,
    wherein the metal wires connected to the second pair of strain gauges include a second pair of metal wires respectively connected to opposing ends of the second pair of strain gauges,
    wherein a longitudinal axis of the first strain gauge and a longitudinal axis of the second strain gauge intersect with each other,
    wherein a longitudinal axis of the third strain gauge and a longitudinal axis of the fourth strain gauge intersect with each other, and
    wherein lengths of line widths and lengths of gaps between lines of the first and third strain gauges are different from lengths of line widths and gaps between lines of the second and fourth strain gauges.

* * * * *